(12) United States Patent
Oinoue

(10) Patent No.: US 7,161,622 B1
(45) Date of Patent: Jan. 9, 2007

(54) ELECTRONIC CAMERA AND ELECTRONIC CAMERA SYSTEM

(75) Inventor: Kenichi Oinoue, Tokyo (JP)

(73) Assignee: Olympus Corporation (JP)

( * ) Notice: Subject to any disclaimer, the term of this patent is extended or adjusted under 35 U.S.C. 154(b) by 660 days.

(21) Appl. No.: 09/627,637

(22) Filed: Jul. 28, 2000

(30) Foreign Application Priority Data

Aug. 25, 1999 (JP) ................................ 11-238683

(51) Int. Cl.
*H04N 5/232* (2006.01)
*H04N 5/76* (2006.01)

(52) U.S. Cl. ............................. 348/211.1; 348/231.1; 348/231.2; 348/231.9

(58) Field of Classification Search ............... 348/211, 348/552, 14.02, 14.12, 14.14, 231.1, 231.2, 348/231.9; 455/556, 566
See application file for complete search history.

(56) References Cited

U.S. PATENT DOCUMENTS

| | | | | |
|---|---|---|---|---|
| 5,034,804 A | * | 7/1991 | Sasaki et al. | 348/231.4 |
| 5,546,445 A | * | 8/1996 | Dennison et al. | 455/408 |
| 5,727,047 A | * | 3/1998 | Bentley et al. | 379/93.05 |
| 5,806,005 A | * | 9/1998 | Hull et al. | 455/566 |
| 5,854,693 A | * | 12/1998 | Yoshiura et al. | 358/468 |
| 5,923,439 A | * | 7/1999 | Tomida et al. | 358/404 |
| 6,075,768 A | * | 6/2000 | Mishra | 370/229 |
| 6,418,324 B1 | * | 7/2002 | Doviak et al. | 455/426.1 |
| 6,535,243 B1 | * | 3/2003 | Tullis | 348/207.1 |
| 6,628,325 B1 | * | 9/2003 | Steinberg et al. | 348/211.1 |

FOREIGN PATENT DOCUMENTS

JP     8-84282     3/1996

* cited by examiner

*Primary Examiner*—Vivek Srivastava
*Assistant Examiner*—Yogesh Aggarwal
(74) *Attorney, Agent, or Firm*—Ostrolenk, Faber, Gerb & Soffen, LLP

(57) ABSTRACT

An electronic camera system including an electronic camera having a recording medium which records image information obtained by shooting an image, a detection arrangement which detects that a memory capacity of the recording medium becomes a predetermined value, and a first interface which transmits and receives information, and a communication unit including a wireless communication arrangement which can transmit an image file, a transmission control arrangement to transmit the image information recorded on the recording medium by the wireless communication arrangement based on a detection signal from the detection arrangement, and a second interface which transmits and receives the information with the first interface of the electronic camera.

8 Claims, 5 Drawing Sheets

ELECTRONIC CAMERA AND ELECTRONIC CAMERA SYSTEM

CROSS-REFERENCE TO RELATED APPLICATIONS

This application is based upon and claims the benefit of priority from the prior Japanese Patent Application No. 11-238683, filed Aug. 25, 1999, the entire contents of which are incorporated herein by reference.

BACKGROUND OF THE INVENTION

The present invention relates to an electronic camera and an electronic camera system, which comprises the electronic camera and a communication unit attached thereto.

In recent years, an electronic camera, which does not require silver salt film, has come into widespread use, and a memory card, which encloses flash ROM, is used in many models of the electronic camera as the recording medium. And, as an improvement of the integration of the semiconductor memory in recent years, the capacity of image data to be recorded on the memory card has been greatly improved.

However, even if it is an environment in which the recording capacity of the memory card has been improved, the capacity of the memory card, which can be used in the electronic camera purchased, is determined according to the model of the electronic camera, and image data cannot be recorded exceeding the capacity of the memory card even when the memory card has the large capacity. Therefore, when an electronic camera is carried, it is necessary to ordinarily prepare a spare memory card beforehand.

In the state that no spare memory card is carried and only one memory card installed in an electronic camera can be used, it takes a great deal of time, since the image file recorded on the memory card is transferred and recorded to, for example, the personal computer of a portable type by connecting it with the electronic camera, or is temporarily transferred and recorded to the personal computer in one's own house or the server of the computer network joined by further connecting a digital mobile telephone and PHS (Personal Handyphone System: second generation cordless telephone system) through the personal computer.

BRIEF SUMMARY OF THE INVENTION

An object of the present invention is to provide an electronic camera system, which can execute a continuous shooting operation without limiting the capacity of the recording medium of the electronic camera and inconvenient operation, etc.

The electronic camera system according to the present invention is characterized by comprising: an electronic camera including a recording medium which records an image information obtained by a shooting operation, detection means which detects that a memory capacity of the recording medium becomes a predetermined value, and a first interface which transmits and receives information; and a communication unit including wireless communication means which can transmit an image file, transmission control means to transmit the image information recorded on the recording medium by the wireless communication means based on a detection signal from the detection means, and a second interface which transmits and receives the information with the first interface of the electronic camera. The preferred features of the electronic camera system according to the present invention are as follows.

(1) The electronic camera further includes first setting means to adjust a memory capacity of the recording medium detected by the detection means.

(3) The transmission control means can connect a plurality of wireless communication systems with different rate systems.

(4) In (3), one of the electronic camera or the communication unit has selection means to select a wireless communication system to be connected based on at least one of the capacity of the image file to be transmitted or a rate system.

An electronic camera according to the present invention is characterized by comprising: a recording medium which makes an image obtained by shooting a file and recording it; wireless communication means that transmits and receives an image information recorded on the recording medium; setting means to set a memory capacity recorded on the recording medium; detection means to detect that a memory capacity recorded on the record recording medium becomes a capacity set by the setting means; and transmission and reception control means to transmit and receive recorded information recorded on the recording medium with the wireless communication means based on a detection signal from the detection means. The preferred features of the electronic camera according to the present invention are as follows.

(1) The wireless communication means and the transmission control means are made as a unit, and the unit can be attached to the electronic camera.

(2) The transmission and reception control means includes position registration means to secure a position to a nearest communication base station automatically, and operates to transmit a recorded information to the nearest communication base station.

(3) The transmission and reception control means includes judgment means to judge whether the recorded information can be transmitted to a nearest communication base station, and the setting means decreases the set memory capacity when the judgment means judges that it is impossible to transmit the recorded information.

(4) The transmission and reception control means includes judgment means to judge whether the recorded information can be transmitted to the communication base station, and the setting means resets the set memory capacity when the judgment means judges that it impossible to transmit the recorded information.

(5) The transmission and reception control means includes means to receive a communication completion signal and means to delete information to be transmitted from the recording medium after the communication completion signal is received.

(6) The transmission and reception control means can be connected with a plurality of wireless communication systems with different rate systems.

(7) In (6), the transmission and reception control means includes selection means to select a wireless communication system to be connected based on at least one of capacity of the image information to be transmitted or the rate systems.

In the electronic camera and the electronic camera system according to the present invention, when the capacity of the image file recorded on the recording medium installed in the electronic camera reaches a predetermined value (threshold value), this value is detected and the image file recorded on the recording medium is transmitted by the wireless communication means. As described above, since the recorded image file is automatically transferred to, for example, the personal computer in one's own house, the laboratory which is contracted beforehand, or the server of the computer network joined beforehand, etc., when the recording capacity of the recording medium becomes a predetermined value, the shooting operation can be continuously executed when the camera is used in the communication area where the above-mentioned communication unit can communicate, even when the capacity of the recording medium is small and the spare recording medium is not carried.

In the above-mentioned configuration, since the threshold value can be adjusted, it is possible to freely set whether information is transferred with many times by dividing information into small units or with few times by a large unit according to the system requirements and the record capacity of the record medium etc.

In addition, in the above-mentioned configuration, since the communication environment by the wireless communication means is measured and the amount of the image file to be transmitted is adjusted according to this measurement result, the image file can surely be transmitted by limiting continuous transmission time according to the electric wave environment.

Since the using wireless communication means can be selected from capacity of the transmitted image file and the plurality of rate systems, the transmission can be executed by automatically selecting a cheaper communication means according to the capacity of the transmitted image file.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
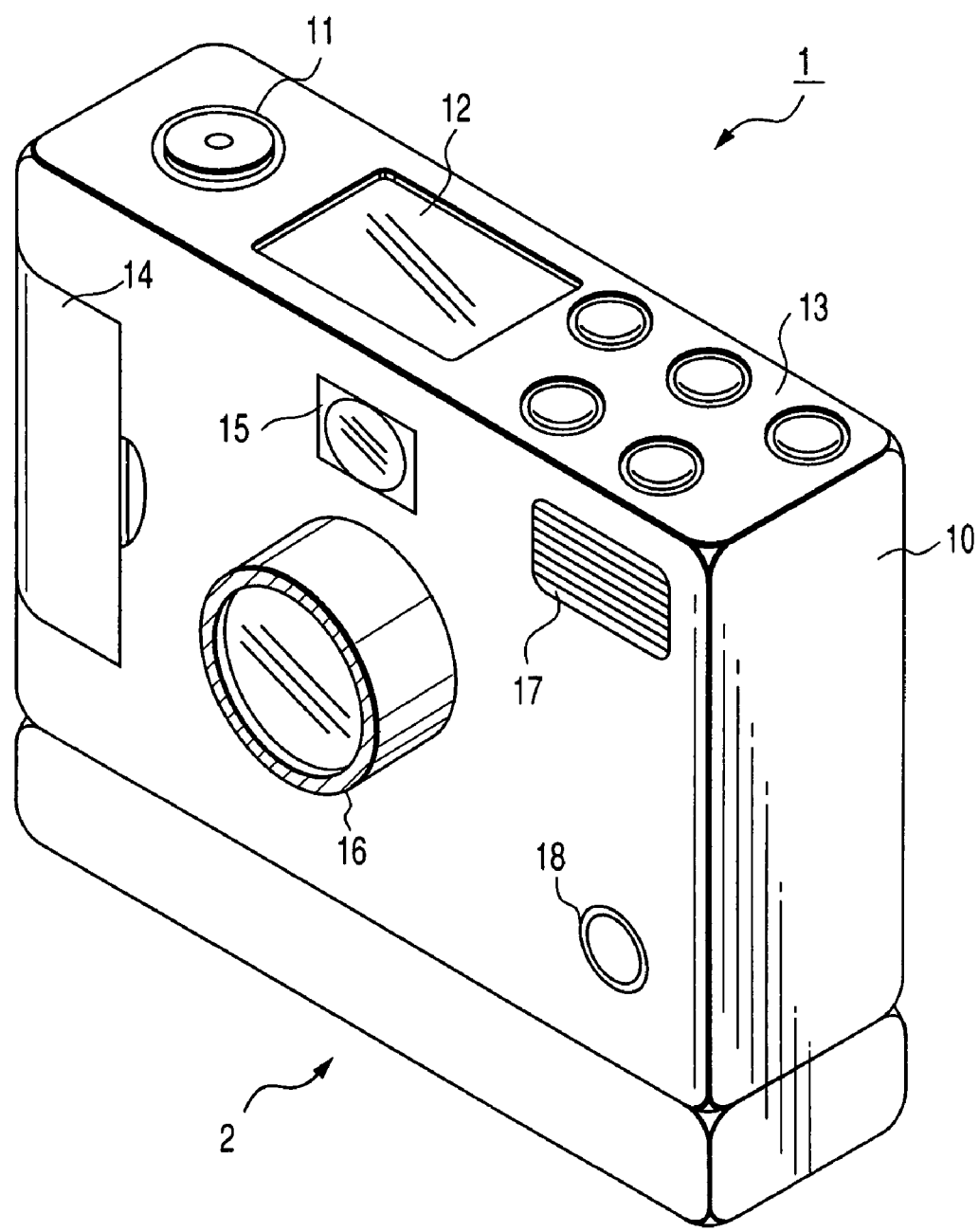
FIG. 1 is a perspective view, which shows an external configuration of electronic camera system according to an embodiment of the present invention.

Hereinafter, an embodiment will be explained referring to the drawings when the present invention is applied to the electronic camera system using a digital mobile telephone.

FIG. 1 is figure, which shows an external configuration, and shows electronic camera 1 and communication unit 2 attached to the bottom of electronic camera 1.

Electronic camera 1 comprises release switch (SW) 11, guide panel 12 with LCD panel of segment type, and various mode switches (SW) 13 which set and instruct each operation mode such as the image transfer mode described later on rectangular parallelepiped camera housing 10.

Card slot cover 14 which covers the slot (not shown in the figure) which inserts the memory card which is the record medium of this electronic camera 1 is installed with free opening and shutting from a right side of camera housing 10 to front surface thereof, and in addition, optical viewfinder window 15, lens mirror cylinder 16, flash luminescence section 17, and the self-timer lamp 18 are properly set in front of camera housing 10.

On the rear surface of camera housing 10, the power supply switch, color TFT-LCD panel which operates electronic viewfinder (EVF), and the optical viewfinder, etc. are provided (here, not shown in the figure).

Communication unit 2 with a thin plate of same size substantially as the bottom of electronic camera 1 are attached to the bottom of electronic camera 1.

This communication unit 2 is attached by combining the screw in the hole for tripod attachment formed in the bottom of electronic camera 1. Therefore, communication unit 2 cannot perform communication and operation by the voice as a general digital mobile telephone, but the image data file can be transferred from electronic camera 1 with the connector (not shown in the figure here). As a result, since communication unit 2 registers the position of the nearest public base station by the position registration processing automatically executed along with movement, the wireless connection is performed with the public circuit net, the image data file received from electronic camera 1 is transferred to the personal computer of own house, the laboratory which is contracted beforehand or, and the data server of the computer network service joined beforehand.

Figure 2:
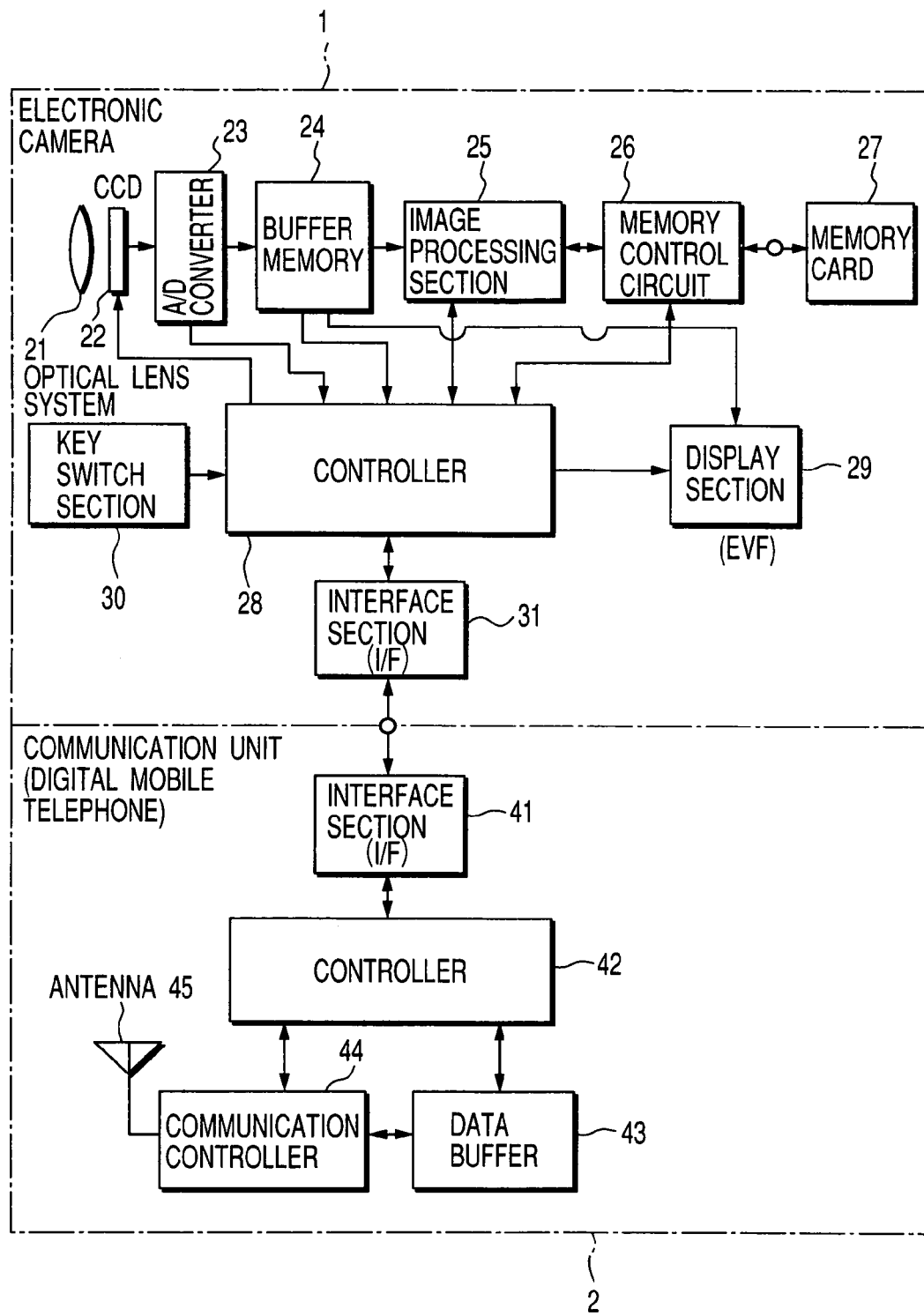
FIG. 2 is a block diagram, which shows a circuit configuration according to this embodiment.

FIG. 2 is a figure, which shows a circuit configuration of above-mentioned electronic camera 1 and communication unit 2.

An optical image of the subject is imaged at the record mode and optical lens system 21 images the optical image on CCD 22 in electronic camera 1. After the output of this CCD 22 is digitalized by each pixel unit in A/D converter 23, the output thereof is sent to buffer memory 24.

Buffer memory 24 saves a plurality of image data with the bit map form. The individual image data saved in buffer memory 24 is compressed at any time by the predetermined file format, for instance, by JPEG in image processing section 25, made to a file, sent to memory control circuit 26, and thereafter, written on memory card 27 which is the record medium of this electronic camera 1 detachably installed.

At this time, image data, in which the number of pixels is greatly decreased, is read from buffer memory 24 to display section 29, and display section 29 displays and drives the TFT-LCD panel as the electronic viewfinder provided to the rear surface of above-mentioned camera housing 10 based on this image data, and the content imaged by CCD 22 is displayed in real time.

On the other hand, at the reproduction mode, the file of the image data recorded on memory card 27 is selectively read with memory control circuit 26, expanded by image processing section 25 according to the procedure opposite to the above-mentioned compression processing, and saved in buffer memory 24 after developing the image data to the bit map form.

The image data saved in this buffer memory 24 is read to display section 29, and the reproduction of the recorded image is displayed by driving TFT-LCD panel with display section 29 based on this image data.

Controller 28 controls all operations of CCD 22, A/D converter 23, buffer memory 24, image processing section 25, memory control circuit 26, and display section 29.

This controller 28 performs the operation control of all circuits of electronic camera 1. Controller 28 is also connected to key switch (SW) section 30, guide panel 12, and interface section (I/F) 31 again, and controls these.

Key switch section 30 includes release switch 11, various mode switches 13, and the power supply switch, etc., and sends the operation signals directly to controller 28.

Guide panel 12 displays various operation states of electronic camera 1 based on the driving control signals from controller 28.

Interface section 31 performs the transmission and reception of data between controller 28 and communication unit 2.

On the other hand, communication unit 2 has interface section (I/F) 41 for data communication with electronic camera 1, controller 42, which performs this operation control of whole communication unit 2, data buffer 43, communication controller 44, which performs transmission and reception of electric wave in, for example, 1.5 Ghz band, as digital mobile telephone, and antenna 45 connected with this communication controller 44, and the data, which is sent from interface section 31 of electronic camera 1, is sent to controller 42 through interface section 41.

Controller 42 always executes the position registration processing with the nearest base station which accompanies movement with communication controller 44 and antenna 45, when image data is sent from electronic camera 1, after holding it in data buffer 43, the image data is transmitted one by one by communication controller 44 from antenna 45 to the base station in which the position is registered.

Next, operation of the above-mentioned embodiment will be explained.

Figure 3:
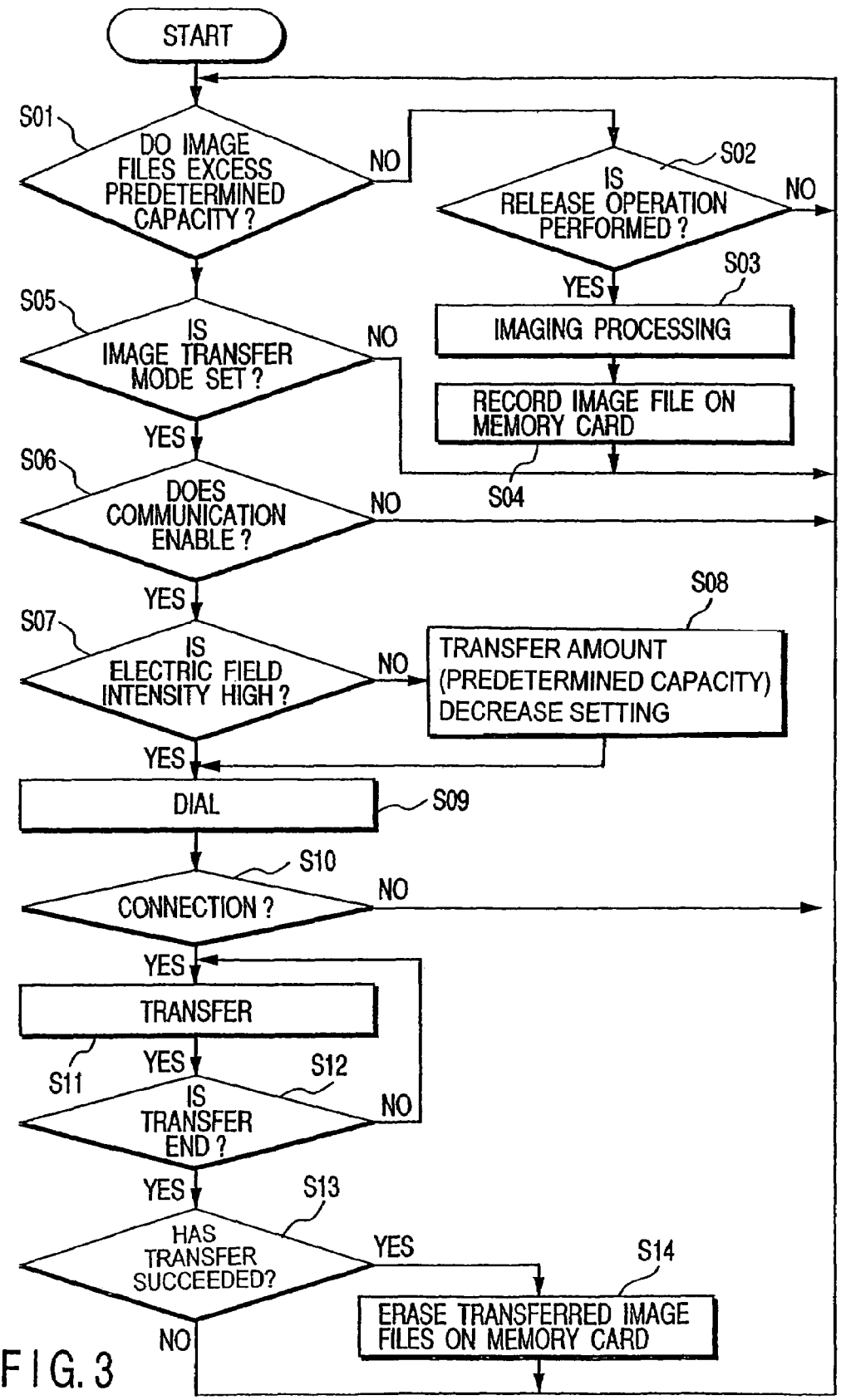
FIG. 3 is a flow chart, which shows a processing content of an operation according to this embodiment.
Figure 4:
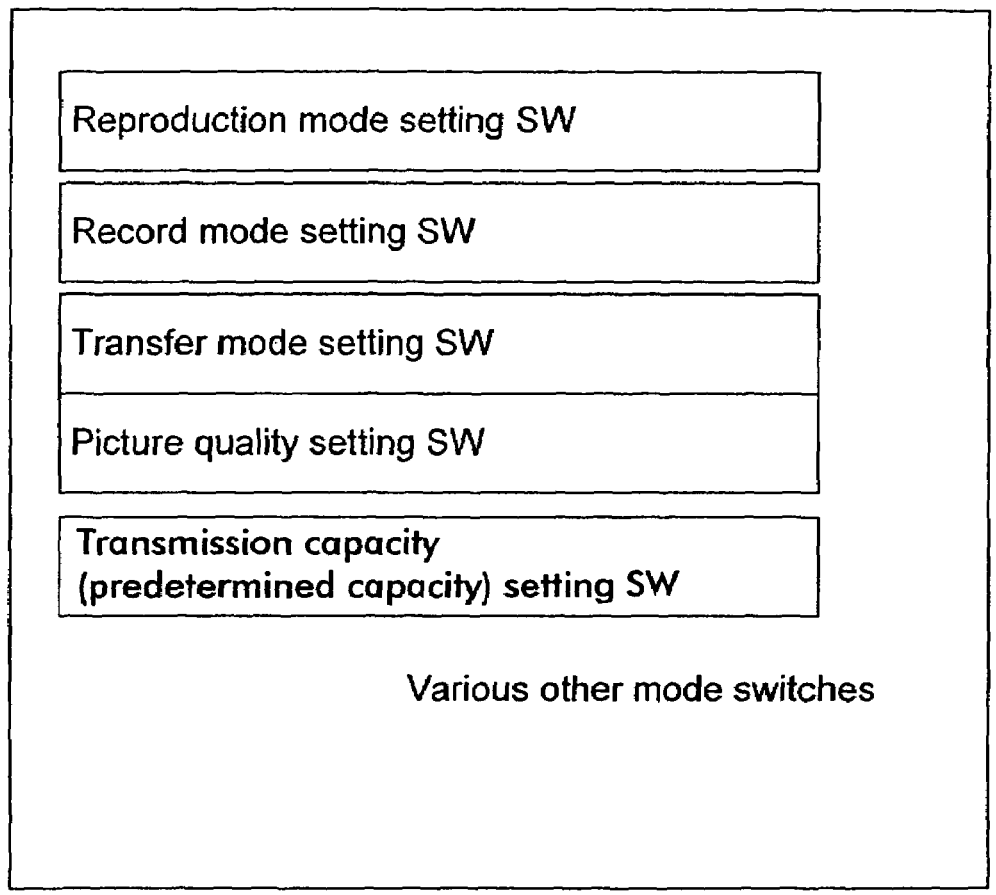
FIG. 4 is a table-style diagram, which shows various operational modes which can be selected via switch actuation for the electronic camera and electronic camera system of the present invention.
Figure 5:
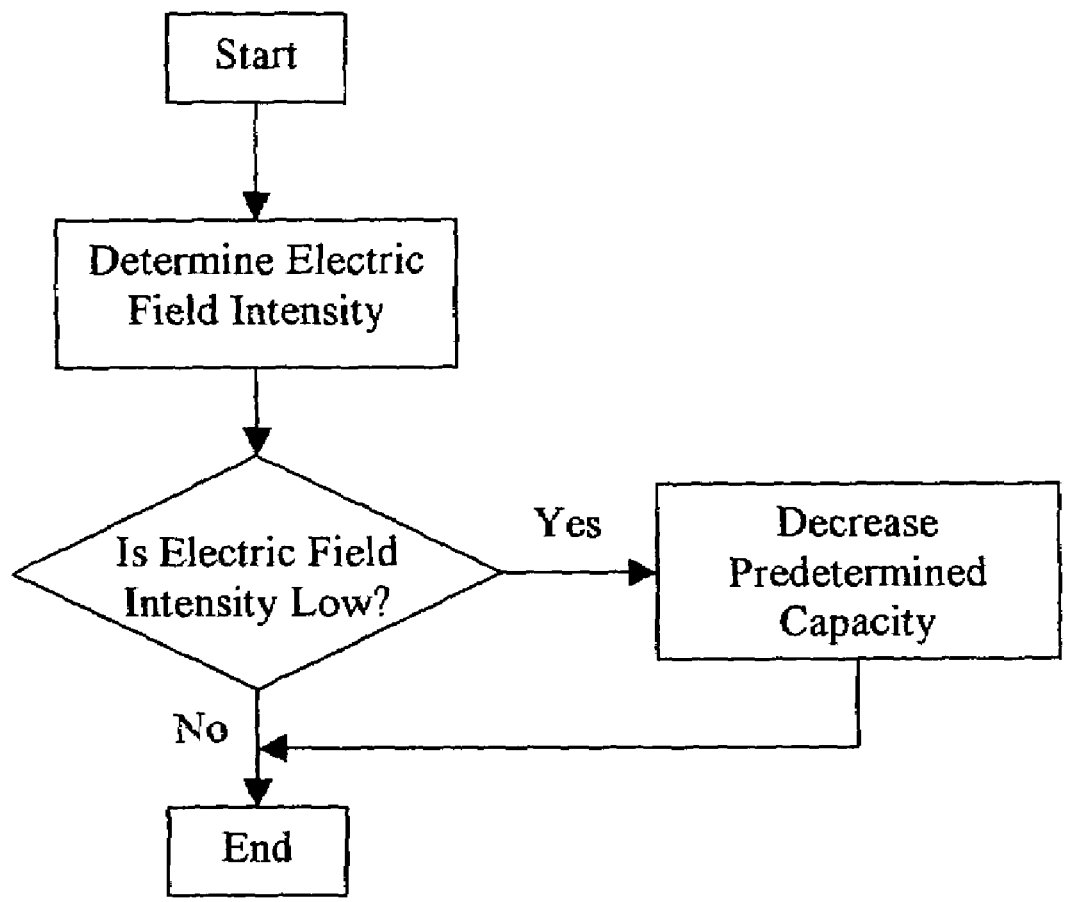
FIG. 5 is a further flow diagram of the present invention.

FIG. 3 shows the processing content at the record mode on the side of electronic camera 1 to which communication unit 2 is attached as one unit. First, whether the capacity of the image data file recorded on memory card 27 exceeds the predetermined constant value or not (step S01) and whether release switch 11 is pushed or not (step S02) are judged, repeatedly. In step S01 and step S02, if the judgment result is "N", the procedure is waited until the judgment result becomes "Y".

That is, in step S01, when the record capacity of memory card 27 is, for example, 8 MB, and the predetermined constant value becomes 6 MB, that is, when remainder capacity of memory card 27 becomes below 2 MB, it is judged "Y".

When there is a push operation of release switch 11 to instruct the shooting, it is judged "Y" in step S02, the distance from electronic camera 1 to the subject image at that time is measured, the proper exposure is measured, and also the proper white balance is adjusted, thereafter flash luminescence section 17 emits light if necessary properly and the shooting is executed (step S03).

The image data obtained from CCD 22 by the shooting is temporarily stored in buffer memory 24 after each configuration pixel is digitalized with A/D converter 23, and the data compression is performed based on JPEG in image processing section 25 and is made to the file.

And, the obtained image data file is recorded on memory card 27 with memory control circuit 26 (step S04). Here, controller 28 manages record of memory card 27 at the same time as this operation. Whether it is possible to shoot the number of images in which the image of the picture quality mode is set at that time, is calculated at remaining capacity, and general processing such as displaying the result with guide panel 12, etc. are executed. In addition, as shown in step S01, controller 28 judges whether the total amount of the recorded image data file exceeds a constant value by newly recording the image data file on memory card 27.

When it is judged that the record capacity of memory card 27 exceeds the predetermined constant value in step S01, it is judged whether the mode, in which the image data file recorded on memory card 27 is transferred if necessary by communication unit 2, is set by operation of above-mentioned various mode switches 13 (step S05).

In step S05, this processing ends, and processing is returned to processing from step S01, when the image transfer mode is not set. In step S05, when the image transfer mode is set, it judges whether the communication to transmit image data is possible by using communication unit 2 (step S06).

In step S06, it is judged whether communication unit 2 can perform the position registration processing to the nearest base station. When it is judged the power supply of communication unit 2 is continuously, turned on, the position registration processing is automatically executed when electronic camera 1 to which communication unit 2 is attached moves. It can be considered to turn on the power supply of communication unit 2 automatically to avoid useless power consumption, when it is judged that the image transfer mode is set in step S05. In such a case, this judgment is executed by performing the position registration processing again after the power supply is turned on.

When communication unit 2 cannot register the position to the nearest base station in step S06, since the data communication cannot be performed, this processing is ended once and processing is returned to processing from step S01 again. When the position can be registered in step S06, it is confirmed whether it is possible to obtain enough electric field intensity, and execute the data communication in a steady state (step S07).

In step S07, only when it is judged that the obtained electric field intensity is low and it is difficult to continue a steady data communication, it is reset such that the amount of the image data file to be continuously transferred is decreased (step S08).

This is processing to transmit the image data file surely by decreasing the amount of the image data file transferred at a time and limiting the time continuously transmitted, when the radio environment is bad.

Thereafter, dial is performed to connect the line with own house, laboratory which is contracted or server of computer network service joined, which transfer destination of image data file (step S09).

And, it is judged whether the line is connected as a result of the dial (step S10). Since the processing for the data transfer cannot be continued any more when the line cannot be connected, this processing is ended above once, and processing is returned to step S01.

When line can be connected, the image data file is read from the memory card 27 one by one and is transferred and transmitted to the connection destination until it is judged that the set amount of data has been transmitted (steps S11 and S12).

And, when it is judged that the transfer is completed, it is judged whether the transfer is succeeded, that is, the transfer is completed without error according to the content of the signal of the confirmation of the data reception of the transfer destination (step S13), and only when it is judged that the transfer succeeded, data, which is transferred among the image data file recorded in memory card 27, is erased, assuming that the transferred image data file is surely recorded at transfer destination (step S14). A series of processing is ended above and returns to processing from step S01 again.

Thus, when the record capacity of memory card 27, which is the record medium, reaches a constant value, since the recorded image data file is automatically transferred and recorded to the predetermined device such as, for example, the personal computer of own house, the laboratory which is contracted or the server of the computer network service etc., in a case that the camera is used in the communication area where communication unit 2 can communicate, the shooting operation can be continued at ease, even when the record capacity of memory card 27 is small and it is time when the spare memory is not carried.

It is desirable the value to judge whether the above-mentioned transfer is performed or not can be freely and variably set according to the record capacity of memory card 27, the radio environment of the use place, and the use object of electronic camera 1, etc. Since information is transferred with many times by dividing information into small units or with few times by a large unit according to the system requirements and the record capacity of the record medium etc., the judgment value can be set by a user so that it may be easy to use most for users, and the data transfer may obstruct the shooting operation.

In the above-mentioned embodiment, it is explained that communication unit 2 is a digital mobile telephone. If a digital mobile telephone and PHS (Personal Handyphone System: second generation cordless telephone system) terminal unit can be used by switching them with one for example, it is possible to set such that the accounted amount becomes smallest account according to each rate system Additionally, the present invention can be carried out by modifying the embodiment described above within the scope of the invention.

What is claimed is:

1. An electronic camera comprising:
   a recording medium which records an image obtained by shooting an image;
   wireless communication means which can transmit and receive an image information recorded on said recording medium;
   setting means to set a memory capacity recorded on said recording medium;
   detection means to detect that a memory capacity recorded on said recording medium reaches a capacity set by said setting means; and
   transmission control means to transmit recorded information recorded on said recording medium with said wireless communication means based on a detection signal from said detection means, wherein
   said transmission control means includes judgment means to judge the capability of transmitting the recorded information to a nearest communication base station, and
   said setting means decreases the set memory capacity when said judgment means judges that there is a low capability to transmit the recorded information.

2. The electronic camera according to claim 1, wherein said setting means sets a memory capacity lower than the set memory capacity when said judgment means judges that there is a low capacity to transmit the recorded information.

3. The electronic camera according to claim 2, wherein said judgment means determines the low capacity to transmit the recorded information according to an electric field intensity of the nearest communication base station.

4. An electronic camera comprising:
   a recording medium which records an image obtained by shooting an image;
   wireless communication means which can transmit and receive an image information recorded on said recording medium;
   detection means to detect that a memory capacity recorded on said recording medium becomes a set memory capacity;
   transmission control means to transmit recorded information recorded on said recording medium with said wireless communication means based on a detection signal from said detection means, said transmission control means including judgment means to judge whether the recorded information can be transmitted to a nearest communication base station; and
   setting means to decrease the set memory capacity when said judgment means judges that there is a low capability to transmit the recorded information.

5. The electronic camera according to claim 4, wherein said setting means decrease the set memory capacity when said judgment means judges that a capacity to transmit the recorded information becomes lower than a predetermined capacity.

6. The electronic camera according to claim 5, wherein the predetermined capacity is determined according to an electric field intensity of the nearest communication base station.

7. A method of transmitting an image from an electronic camera having wireless communication means which can transmit and receive an image information, comprising:
   recording an image obtained by shooting an image on a recording medium as a transmittable capacity;
   detecting that the memory capacity recorded on said recording medium becomes a set memory capacity;
   judging whether the recorded information can be transmitted to a nearest communication base station, decreasing the set memory capacity when it has been judged that there is a low capability to transmit the recorded information.

8. A method of transmitting an image from an electronic camera having wireless communication means which can transmit and receive an image information, comprising:
   recording an image obtained by shooting an image on a recording medium;
   setting a memory capacity recorded on the recording medium as a transmittable capacity;
   detecting that the memory capacity recorded on said recording medium becomes a set memory capacity;
   judging whether the recorded information can be transmitted to a nearest communication base station, decreasing the set memory capacity when it has been judged that there is a low capability to transmit the recorded information.

* * * * *